Nov. 3, 1964   J. F. SCHULZ ETAL   3,155,755
APPARATUS AND PROCESS FOR MANUFACTURING CEMENT ARTICLES
Filed June 22, 1959
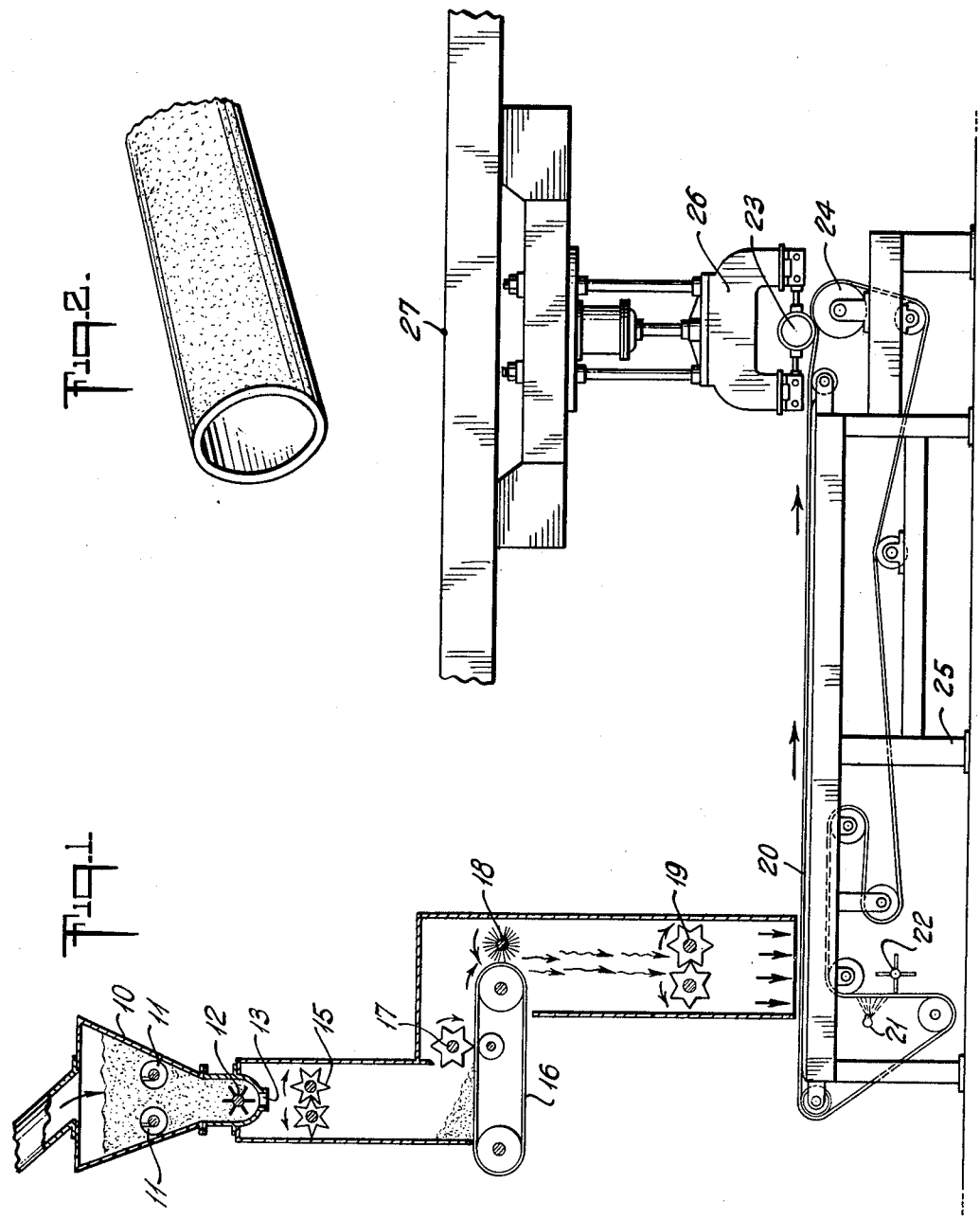
INVENTORS
RAFAEL A. D'AMATO
HOWELL S. JOBBINS
BY JOSEPH F. SCHULZ
ATTORNEY

United States Patent Office 3,155,755
Patented Nov. 3, 1964

3,155,755
APPARATUS AND PROCESS FOR MANU-
FACTURING CEMENT ARTICLES
Joseph F. Schulz, Allendale, Howell S. Jobbins, Livingston, and Rafael A. D'Amato, East Rutherford, N.J., assignors to The Flintkote Company, a corporation of Massachusetts
Filed June 22, 1959, Ser. No. 821,936
2 Claims. (Cl. 264—109)

The present invention relates to an apparatus and process for manufacturing cement articles and more particularly to a process and apparatus for manufacturing cement pipe or sheet material which may contain asbestos or the like.

Asbestos cement pipe is a well known article of manufacture which has been on the market for many years. It comes in various degrees of strength for different purposes and as such may contain various amounts of various grades of asbestos. The pipe is ordinarily manufactured on a wet machine which is somewhat similar to a papermaking machine in that the asbestos and the cement are in the form of a slurry with a substantial quantity of water. The slurry contacts a felt or some other device on which it is supported while the water is removed. When a sufficient thickness of the filtered slurry has been accumulated it is wrapped on a mandrel. It may be further treated on the mandrel and may then be removed and cured. There are a number of problems with this process involving the removal of the excess water, for example, the formulation must permit sufficient drainage.

Asbestos-cement sheets have been made by both a wet and a dry process. The dry process usually involves a layer of asbestos and cement in dry form of substantial thickness formed on a supporting web. The material is then sprayed with sufficient water to set the cement and subjected to pressure to form a sheet which may subsequently be treated for curing purposes.

It is an object of the present invention to provide an improved process and apparatus for the manufacture of asbestos cement products.

It is a further object of the present invention to provide an improved process and apparatus for the manufacture of asbestos cement products by a dry process.

It is a further object of the present invention to provide an improved process and apparatus for the manufacture of asbestos cement products by a dry process involving a unique method of adding just sufficient water for the cement setting.

The invention may be best understood by reference to the attached drawings but it will be understood that variations and substitutions may be made within the scope of the claims.

In the drawings:

FIG. 1 is a diagrammatic cross section of a machine in accordance with the present invention and;

FIG. 2 is a perspective view of a section of pipe made in accordance with the present invention.

With reference to FIG. 1 there is shown a hopper 10 which extends the width of the machine and contains agitator rolls 11 adapted to mix and prevent packing of the contents of the hopper. The hopper may contain a mixture of cement, asbestos and sand which will be more fully described below. Finger roller 12 controls the feed through opening 13 extending across the bottom of the hopper the width of the machine. The material falls down upon a pair of intermeshed star-shaped gears 15 or finger rolls which tend to fluff the material and distribute it more evenly across the width of the machine. The material then falls upon a pony belt 16. Another fingered roll 17 continues the leveling process as the pony belt carries the material past a rotary brush 18. The material again passes through intermeshing gears 19, similar to gears 15. By the use of this combination of gears, pony belt and brush, the material is finally dropped on a moving felt 20 in a pattern which may be described as a raindrop pattern. By this is meant the pattern is random but perfectly uniform from side to side of the machine over a period of time. Furthermore the material is preferably not dropped in a solid continuous layer of appreciable thickness but rather there are preferably spots on the felt where no material at all is present.

The felt is preferably a papermaker's blanket or felt which is continuous and passes in front of a spray of water 21 and whipper 22 for the two-fold purpose of removing any particles of cement or the like which may have passed the mandrel. The excess water is pressed out by passing the felt over a number of rollers, or if necessary, between press rolls not shown before passing under the hopper where it receives the raindrop pattern of cement or the like. The felt 20 passes in contact with a smooth mandrel 23 which is urged against opposition roll 24 over which the felt passes. Any one of a number of means may be used to urge the mandrel against the opposition roll as are well known in the art. The mandrel may be urged simply by its own weight but preferably a third roll or another pair of rolls not shown may be applied against the mandrel in order to exert a pressure against the cement particles which are building up on the mandrel. The pressure between the mandrel and the opposition roll causes sufficient water to be squeezed from the felt wetting the cement particles. The thickness and other contacts of the felt can be controlled as well as the water applied to it such that the amount of water squeezed out will be sufficient to set the cement, but not too much to form a slushy body which is not easily pressed. The whole felt together with various guide rolls are mounted on a suitable support 25. There is also shown a hydraulic lift device 26 which may be suspended from an overhead rail 27 such that mandrels containing the cement composition may be quickly removed and others put in place.

While the invention is primarily concerned with asbestos-cement pipe it will be understood that cement alone or with other structural ingredients such as sand or other fiber or filler may be utilized. It will be further understood that the mandrel 23 may be of a diameter particularly suitable for forming pipe but on the other hand may be of a large diameter such that the accumulation thereon may be stripped and the equipment may thus be used to manufacture flat sheets which may be peeled from a large diameter mandrel.

While the papermaker's felt is preferable, the device may also utilize other webs which may or may not carry their own water. In the use of a web not carrying water impregnated therein, a spray not shown may be located above the web either before or after the application of the cement particles. One formulation which has been found suitable for forming an asbestos-cement pipe involves the use of 23% by weight of 4K asbestos, 48% of Portland cement and 29% of silica or finely ground sand passing a 200 mesh screen. Other proportions, other types of asbestos fiber, or introducing other fibers such as fiberglass, rock wool, wood fiber and the like may be utilized. Other water settable cements may be used, and these include, besides Portland cement, lumnite cement, plaster and the like.

The pipe or the like may be removed from the mandrel by any of the known methods including introducing a bubble of air between the rotating mandrel and the surface of the pipe. The pipe may be air cured, autoclaved or both.

The apparatus and process have a number of outstanding advantages. The equipment is less expensive than wet process equipment, there is no problem of water disposal, no problem of formulating to permit drainage and the strengths of the products obtained are very high because high pressures can be applied before the material has had any opportunity to set up. For any given pressure applied to the mandrel the pipe will be stronger than equivalent wet process pipe made at the same pressure. Since there is no problem of drainage as compared with the wet process, the machine may attain very high speed and consequently it is possible to make a product, as for example, a pipe of a given thickness, say ½" by the use of a large number of layers of asbestos cement. The product made with a larger number of layers other things being equal, tends to be stronger than a product made with fewer layers. Asbestos-cement pipe made in accordance with the present process and apparatus may be used for air ducts, sewer pipes and sewer mains, electrical conduit and the like. The higher pressure pipe may also be used for water supply. Flat sheets made by the present process have limited shrinkage and excellent strength.

We claim:

1. A process for producing cement products on a rotatable cylindrical mandrel comprising the steps of applying a layer of dry cement to a moving wet felt in a random uniformly distributed pattern, bringing the cement bearing surface of said felt into engagement with at least a portion of the peripheral surface of said mandrel, applying pressure to said felt engaging said mandrel to squeeze water from said felt into said layer of dry cement, and transferring a plurality of layers of moistened cement from said felt to said mandrel utilizing only the water in the wet felt, the quantity of water squeezed into said dry cement being sufficient to set the cement and less than that required to produce a slushy mass.

2. Apparatus for producing asbestos-cement pipe comprising a moving felt, means for depositing a layer of dry asbestos-cement composition on said felt in a random uniformly distributed pattern, means for applying water to said felt, a rotatable cylindrical mandrel in contact with the cement bearing surface of said felt, and means located where the felt and the mandrel are in contact for applying pressure to said felt to squeeze water from said felt into said layer of dry cement and effect the transfer of wet cement from said felt to said mandrel in a plurality of layers; the thickness of the felt, the quantity of water applied thereto and the pressure being exerted being selected to transfer sufficient water to the dry cement to set the same and less than that required to produce a slushy mass.

References Cited in the file of this patent

UNITED STATES PATENTS

| | | |
|---|---|---|
| 1,627,104 | Mattei et al. | May 3, 1927 |
| 1,670,855 | Herzog | May 22, 1928 |
| 2,004,703 | Maynani | June 11, 1935 |
| 2,200,267 | Ferla | May 14, 1940 |
| 2,364,061 | Ferla | Dec. 5, 1944 |
| 2,859,484 | French et al. | Nov. 11, 1958 |